US008506843B2

(12) United States Patent
Srivastava et al.

(10) Patent No.: US 8,506,843 B2
(45) Date of Patent: Aug. 13, 2013

(54) WHITE EMITTING PERSISTENT PHOSPHOR

(75) Inventors: Alok Srivastava, Niskayuna, NY (US); Holly Ann Comanzo, Niskayuna, NY (US); Sam Camardello, Niskayuna, NY (US); William W. Beers, Chesterland, OH (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 12/971,569

(22) Filed: Dec. 17, 2010

(65) Prior Publication Data

US 2012/0153227 A1 Jun. 21, 2012

(51) Int. Cl.
C09K 11/55 (2006.01)
C09K 11/64 (2006.01)

(52) U.S. Cl.
USPC .............................. 252/301.4 R; 252/301.6 R

(58) Field of Classification Search
USPC ..................................... 252/301.4 F, 301.6 R
See application file for complete search history.

(56) References Cited

U.S. PATENT DOCUMENTS

| | | | | |
|---|---|---|---|---|
| 5,376,303 A * | 12/1994 | Royce et al. | ........... | 252/301.4 R |
| 5,885,483 A | 3/1999 | Hao et al. | | |
| 6,117,362 A | 9/2000 | Yen et al. | | |
| 6,267,911 B1 | 7/2001 | Yen et al. | | |
| 7,959,827 B2 * | 6/2011 | Comanzo et al. | ...... | 252/301.4 R |
| 8,003,012 B2 * | 8/2011 | Comanzo et al. | ...... | 252/301.4 R |
| 2003/0227002 A1 | 12/2003 | Brown et al. | | |
| 2003/0227003 A1 | 12/2003 | Brown et al. | | |
| 2004/0135122 A1 | 7/2004 | Hyland, Jr. et al. | | |
| 2004/0164277 A1 | 8/2004 | Yen et al. | | |
| 2005/0212397 A1 | 9/2005 | Murazaki et al. | | |
| 2007/0096058 A1 | 5/2007 | Hirata et al. | | |
| 2007/0131907 A1 | 6/2007 | Hirata et al. | | |
| 2008/0171229 A1 | 7/2008 | Comanzo et al. | | |
| 2008/0179567 A1 * | 7/2008 | Comanzo et al. | ...... | 252/301.6 R |
| 2008/0185557 A1 | 8/2008 | Agrawal et al. | | |
| 2009/0152497 A1 * | 6/2009 | Comanzo et al. | ...... | 252/301.6 R |
| 2010/0038591 A1 | 2/2010 | Matsuhisa et al. | | |
| 2010/0136302 A1 * | 6/2010 | Comanzo et al. | .......... | 428/195.1 |

FOREIGN PATENT DOCUMENTS

| | | |
|---|---|---|
| EP | 0148110 | 7/1985 |
| EP | 0710709 A1 | 5/1996 |
| EP | 0765925 | 4/1997 |
| EP | 1681334 | 7/2006 |
| EP | 1900789 | 3/2008 |
| GB | 2433155 | 4/2008 |
| JP | 2000034480 | 2/2000 |
| JP | 2002020744 | 1/2002 |
| WO | 9632457 | 10/1996 |
| WO | 9950372 A1 | 10/1999 |
| WO | 2005044944 | 5/2005 |
| WO | 2005044946 | 5/2005 |
| WO | 2007034609 | 3/2007 |
| WO | 2007143379 | 12/2007 |
| WO | 2008041760 | 4/2008 |

OTHER PUBLICATIONS

Liu, C. et al: "Adjusting luminescence properties of Sr.,Ca1_xA17O4: Eu2+, Dy3+ phosphors by Sr/Ca ratio", Journal of Alloys and Compounds, Elsevier Sequoia, Lausanne, CH, vol. 470,No. 1-2, Feb. 20, 2009, pp. 473-476, XP025913181, ISSN: 0925-8388.

Aitasalo T. et al: "Persistent luminescence phenomena in materials doped with rare earth ions", Journal of Solid State Chemistry, Orlando, FL, US, vol. 17, Jan. 1, 2003, pp. 114122, XP002515283, ISSN: 0022-4596.

Xie, Wie et al.: "Structure and luminescence properties of Sr4Al14O25 : +>, Dy<3+> byCa<+>", The Institution of Electrical Engineers, Stevenage, GB, Feb. 2010, XP002670833, & Acta Physica Sinica Chinese Physical Society China, vol. 59, No. 2, Feb. 1, 2010, pp. 1148-1154, ISSN: 1000-3290.

Search Report and Written Opinion dated Mar. 19, 2012 from corresponding Application No. PCT/US2011/064526.

* cited by examiner

Primary Examiner — Carol M Koslow
(74) Attorney, Agent, or Firm — Pearne & Gordon LLP

(57) ABSTRACT

This disclosure features a persistent phosphor having the following formula I:

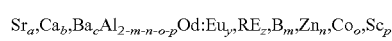

$$Sr_a, Ca_b, Ba_c Al_{2-m-n-o-p} Od:Eu_y, RE_z, B_m, Zn_n, Co_o, Sc_p \quad I$$

where a and b each range from about 0.3 to about 0.7; c is between about 0 and about 0.1; $0.75 \leq a+b+c+y+z \leq 1.3$; y is between about 0.0005 and about 0.1; RE is any rare earth element alone or in combination; z is between about 0.0005 and about 0.15; m is between about 0.0005 and about 0.30; n is between about 0 and about 0.10; o is between about 0 and about 0.01; p is between about 0 and about 0.10 and d ranges from about 3.945 to about 4.075. Once the persistent phosphor has been excited it appears white in an absence of ambient light. Also featured is an article of manufacture that includes the phosphor.

15 Claims, 4 Drawing Sheets

WHITE EMITTING PERSISTENT PHOSPHOR

FIELD OF THE INVENTION

This disclosure pertains to a white emitting persistent phosphor, which can be formed as a solid solution having a single crystalline phase.

BACKGROUND OF THE INVENTION

Researchers have tried to produce a white persistent phosphor by blending a blue persistent phosphor, a green persistent phosphor and a red persistent phosphor. However, this approach is problematic because each of the persistent phosphors decays at a different rate, causing a color change with time, the blend is of low intensity and is not long persisting within the white color regime.

Phosphor compositions based on $(Ba, Sr, Ca)Al_2O_4:Eu^{+2}, Dy^{+3}$ have been known to produce a high efficiency long persistent green emission color. Also, compositions based on $(Ba, Sr, Ca)Al_2O_4:Eu^{+2}, Nd^{+3}$ have been known to produce a high efficiency long persistent blue emission color. However, producing a high efficiency, long persistent white phosphor remains elusive.

BRIEF DESCRIPTION OF THE INVENTION

This disclosure features a persistent phosphor having the following formula I:

$$Sr_aCa_bBa_cAl_{2-m-n-o-p}O_d:Eu_y,RE_z,B_m,Zn_n,Co_o,Sc_p \qquad I$$

where a and b each range from about 0.3 to about 0.7; c is between about 0 and about 0.1; $0.75 \leq a+b+c+y+z \leq 1.3$; y is between about 0.0005 and about 0.1; RE is any rare earth element alone or in combination, in particular, one or both of $Dy^{3+}$ and $Nd^{3+}$, and more particularly $Dy^{3+}$; z is between about 0.0005 and about 0.15; m is between about 0.0005 and about 0.30; n is between about 0 and about 0.10 and, in particular, is between about 0.0005 and about 0.10, even more specifically, from about 0.005 to about 0.10; o is between about 0 and about 0.01; p is between about 0 and about 0.10 and d ranges from about 3.945 to about 4.075, and is in particular 4. All of the subscript variables describe molar amounts. Cobalt's and europium's oxidation states can be 2+; all other oxidation states of the elements of formula I should be apparent to one of ordinary skill in the art in view of this disclosure.

Charge compensation may take place by excess oxygen ions in the structure or by inducing cation vacancies. For example, when $Dy^{3+}$ substitutes for $Sr^{2+}$, the charge compensation may take place by introducing a $Sr^{2+}$ ion vacancy by the process $2Dy^{3+} \rightarrow ^3Sr^{2+}[\ ]_z$. Or the charge compensation may occur via the process $Sr_{1-z}Dy_zAl_2O_{4+z/2}$. Similarly, when $Co^{2+}$ substitutes for $Al^{3+}$ the charge compensation may occur via $SrAl_{2-o}Co_oO_{4-o/2}$ (where the subscript is the letter o, not the number 0). But, this disclosure is not limited to these charge compensation modes.

As discussed, a and b each range from about 0.3 to about 0.7. More specifically, a and b each can range from about 0.4 to about 0.6. In particular, a can range from about 0.3 to about 0.4 and b can range from about 0.6 to about 0.7. Variable a can also range from about 0.4 to about 0.5 and b can range from about 0.5 to about 0.6. In addition, a can range from about 0.5 to about 0.6 and b can range from about 0.4 to about 0.5. In one aspect, a is about 0.3 and b is about 0.7. In another aspect a is about 0.4 and b is about 0.6. In yet another aspect each of a and b is about 0.5.

Once the persistent phosphor has been excited it appears white in an absence of ambient light. When formulated according to formula I, a single phase crystalline material can be produced as determined by X-ray diffractometry.

When numerical values are given as a range in this disclosure they include the endpoints of the range; for example, values ranging from about 5 to about 25 include 5 and 25.

Many additional features, advantages and a fuller understanding of the invention will be had from the accompanying drawings and the Detailed Description that follows. It should be understood that the above Brief Description of the Invention describes embodiments of this disclosure in broad terms while the following Detailed Description of the Invention describes embodiments of this disclosure more narrowly and presents specific embodiments that should not be construed as necessary limitations of the broad invention as defined in the claims.

DETAILED DESCRIPTION OF THE INVENTION

Figure 1:
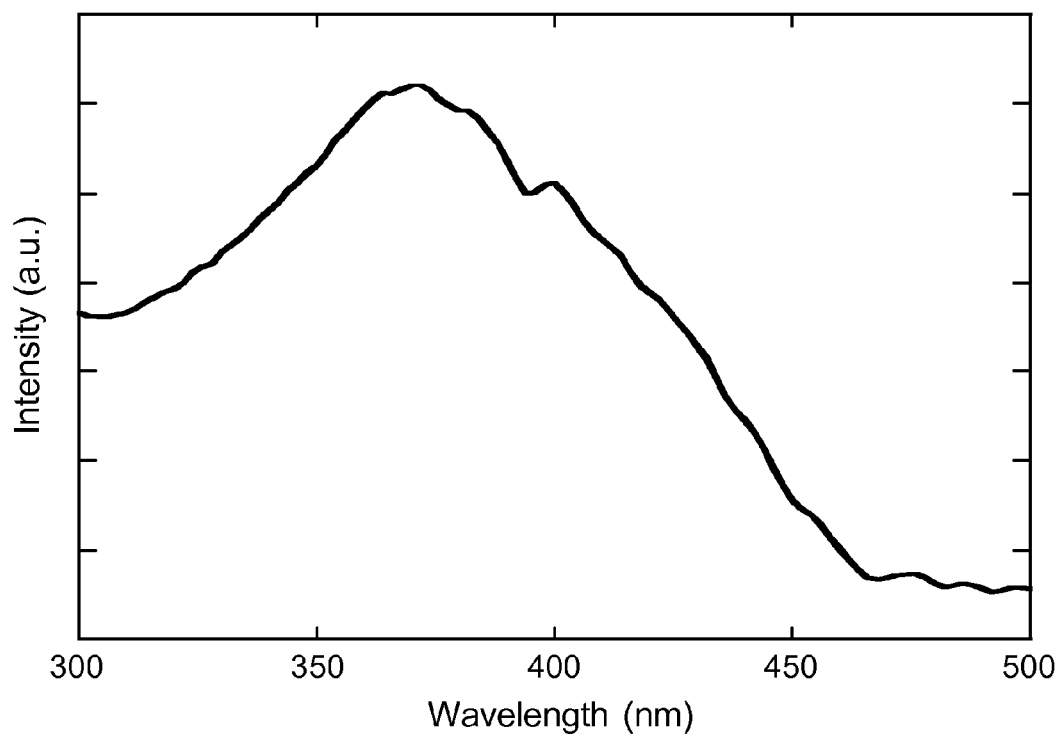
FIG. 1 is a graph showing the excitation behavior of one of the phosphors of this disclosure, $(Sr_{0.46}Eu_{0.01}Dy_{0.03}Ca_{0.5})Al_{1.9}B_{0.1}O_4$.

This disclosure features the persistent phosphor having the following formula I:

$$Sr_aCa_bBa_cAl_{2-m-n-o-p}O_d:Eu_y,RE_z,B_m,Zn_n,Co_o,Sc_p \qquad I$$

where a and b each range from about 0.3 to about 0.7; c is between about 0 and about 0.1; $0.75 \leq a+b+c+y+z \leq 1.3$; y is between about 0.0005 and about 0.1; RE is one or both of $Dy^{3+}$ and $Nd^{3+}$, and more particularly $Dy^{3+}$; z is between about 0.0005 and about 0.15; m is between about 0.0005 and about 0.30; n is between about 0 and about 0.10; o is between about 0 and about 0.01; p is between about 0 and about 0.10 and d ranges from about 3.945 to about 4.075. An example of a white persistent phosphor formulation where a and b are each about 0.50 is: $(Sr_{0.46}Eu_{0.01}Dy_{0.03}Ca_{0.5})Al_{1.9}B_{0.1}O_4$. The phosphor of formula I can be white emitting in the absence of ambient light. Whenever the phosphor of this disclosure is discussed, unless otherwise apparent from the text, the phosphor of formula I is being referred to.

The phosphor of formula I can be formed by the following process. The oxygen-containing starting material compounds used to prepare the formulation of formula I may be in the form of oxides, carbonates, nitrates, sulfates, phosphates, citrates, carboxylates, and combinations of these compounds. In embodiments containing carboxylates, the carboxylates used may have from one to five carbon atoms, such as formates, ethanoates, proprionates, butyrates, and pentanoates. These starting compounds are present in amounts (% wt) that can produce the solid solution of formula I having the indicated molar amounts of atoms.

As to the details regarding the following process, refer to U.S. patent application Ser. No. 12/640,712 (corresponding to published U.S. application Pub. No. US 2010/0136302). The mixture of starting materials for producing the white persistent phosphor can also comprise a flux, such as boric acid, lithium tetraborate, lithium carbonate, hydrogen borate, an alkali hydroborate, or a mixture of these compounds. According to another embodiment of the present invention, the flux may be a halide compound, such as a fluoride, of europium, neodymium, the alkaline-earth metals, or the group 13 metals. The halide compound can comprise up to 10 percent, by weight, of the mixture. The flux may also be an alkali halide, such as lithium fluoride, sodium fluoride, or other alkali halides. When using a flux, it may be desirable to wash the product with hot water to remove residual soluble impurities originating from the flux.

The oxygen containing starting compounds may be mixed together by any mechanical method. In exemplary embodiments, such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders is fired in a reducing atmosphere at a temperature in a range from about 900° C. to about 1,700° C. for a time sufficient to convert the mixture to a solid solution of the phosphor. For example, the temperature may be in the range from about 1,000° C. to about 1,400° C. and, in particular about 1200° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 3° C./minute to about 200° C./minute. In exemplary embodiments, the temperature is raised to the final temperature at rates of about 10° C./minute to about 100° C./minute. Those skilled in the art will recognize that the precise conditions needed for the synthesis of a particular phosphor composition will depend on the phosphor chosen and are within the ambit of the conditions above.

The firing is performed under a reducing atmosphere, which may include such compounds as hydrogen, carbon monoxide, ammonia, hydrazine, or a mixture of these compounds with an inert gas such as nitrogen, helium, argon, krypton, xenon.

In one aspect a mixture of hydrogen and nitrogen, containing hydrogen in an amount from about 0.5 volume percent to about 10 volume percent may be used as a reducing gas. A particular atmosphere is 1% $H_2$ and 99% $N_2$. In another aspect the reducing gas may be carbon monoxide, generated in situ in the firing chamber by the reaction between residual oxygen and carbon particles placed in the firing chamber. In yet another aspect, the reducing atmosphere is generated by the decomposition of ammonia or hydrazine. In exemplary aspects, after firing, the phosphor may be ball milled in a propanol slurry to break up aggregates that may have formed during firing.

The phosphors of this disclosure may be made into particles of about 1 to 5 microns, or larger, using standard firing techniques. Alternatively, nano-scale particles may be made using emulsion techniques.

Incorporation of the phosphors into a matrix or a layer on a substrate may be implemented using standard processing techniques for the matrix material chosen. For example, in embodiments of the current invention, the phosphors could be incorporated into a paint composition by mixing a powder blend into the base paint mixture, as if the phosphors were a dry pigment. In other embodiments, the phosphors could be stirred into a solvent to form a slurry prior to incorporation in the base paint mixture. The paint is an article of manufacture.

The persistent phosphors of this disclosure may be used in any number of applications requiring long term light in locations that have no energy source for powered lighting. A plastic matrix may contain embedded particles of a persistent phosphor. On the other hand, the phosphor particles may be incorporated into the plastic matrix of a film or surface layer attached to the body of a structure. Refer to U.S. patent application Ser. No. 12/640,712, for a description of a plastic matrix with embedded phosphor or a film or surface layer attached to the body of a structure. Incorporation of the phosphor particles into the matrix or surface layer may be implemented using normal plastics processing techniques. Such techniques could include compression molding, injection molding, sheet forming, film blowing, or any other plastics processing technique that can incorporate a dry powder into a plastic matrix. One skilled in the art will recognize that the plastic matrix material used in these techniques may be any thermoplastic material with sufficient translucency to allow light transfer through thin layers, including, but not limited to, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Furthermore, thermoset materials may also be used for the plastic matrix, including such compounds as silicon room temperature vulcanized (RTV) compounds and epoxies, among others. The phosphors can be incorporated into the thermoset resins by mixing the phosphor with one of the two reactant portions. Further, the matrix does not need to be plastic. One of ordinary skill in the art will recognize that the phosphors of the present disclosure may be incorporated into glass or ceramic matrices as well. The phosphor may be incorporated into a liquid such as a paint or resin which can form the matrix or the film on a substrate.

Particles of the phosphor may lack compatibility with the matrix leading to agglomeration during processing. This effect may be especially severe for smaller particles, such as nano-scale particles, discussed below. For both types of phosphor particles, the effect may be lessened by coating the particles prior to incorporation in the matrix. The coating may include either small molecule ligands or polymeric ligands. Exemplary small molecule ligands may include octyl amine, oleic acid, trioctylphosphine oxide, or trialkoxysilane. Those skilled in the art will realize that other small molecule ligands may be used in addition to, or in place of, those listed here. The particles may also be coated with polymeric ligands, which may be either synthesized from the surface of the particles or added to the surface of the nano-scale particles. A discussion of growing polymer chains from the surface of the phosphor particles and coating the phosphor particles with a polymer coating is provided in the Ser. No. 12/640,712 application.

The fired phosphor may be milled to form smaller particles and break up aggregates. The final phosphor may then be incorporated into the matrix to form the final product. If still smaller particles are needed, micro-emulsions may be used to generate nano-scale particles. Such nano-scale phosphor particles may be from about 900 nm to 100 nm in size, or even smaller. A discussion of a sol-gel based micro-emulsion process for the formation of nano-scale particles of a metal oxide phosphor is provided in the Ser. No. 12/640,712 application. Another microemulsion-based process for forming nano-scale particles of the metal oxide phosphor is also discussed in the Ser. No. 12/640,712 application.

Figure 2:
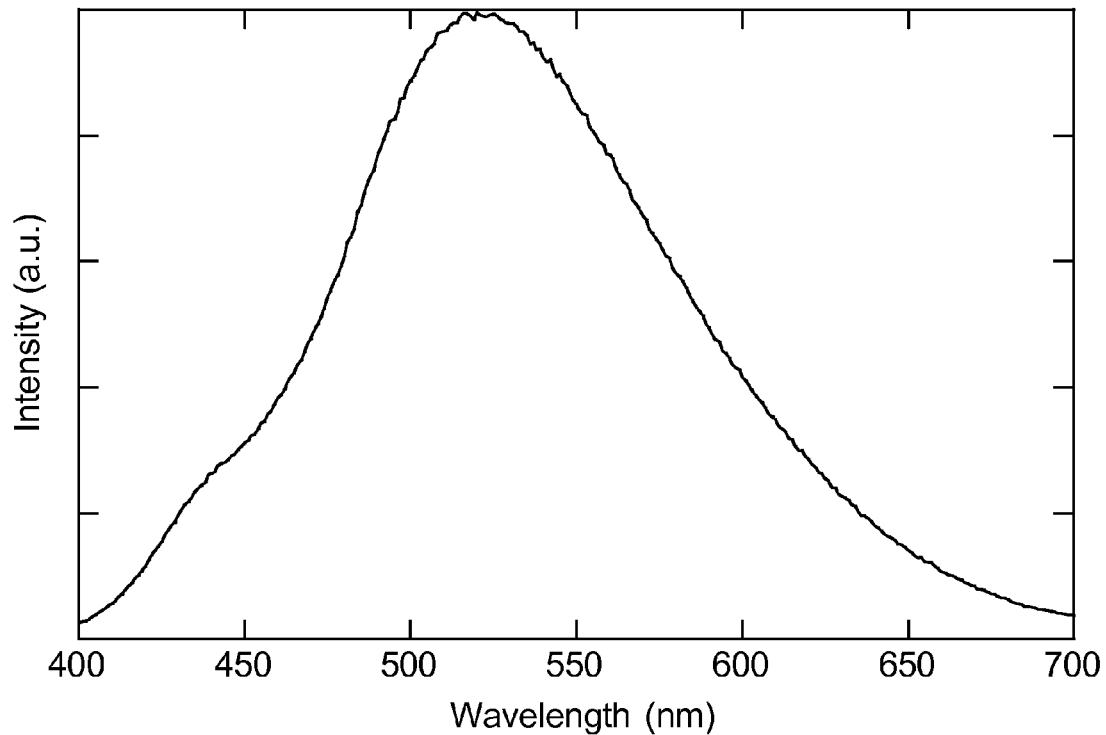
FIG. 2 is a graph showing the emission behavior of the phosphor $(Sr_{0.46}Eu_{0.01}Dy_{0.03}Ca_{0.5})Al_{1.9}B_{0.1}O_4$.

The excitation and emission spectra for a white persistent phosphor made as disclosed herein are shown in FIGS. 1 and 2, respectively. This phosphor had the following composition: $(Sr_{0.46}Eu_{0.01}Dy_{0.03}Ca_{0.5})Al_{1.9}B_{0.1}O_4$. In this figure it can be seen that the peak of the excitation spectrum is around 370 nm. This allows light from sources that have intensity in this region, such as sunlight or fluorescent lights, to charge the phosphor of this disclosure with energy. As the phosphor is charged, energy is transferred to the activation sites where it is retained by ions in the excited state for long periods of time prior to those ions losing the energy through the emission of a photon. The spectrum of the emitted light extends from about 400 to about 700 nm peaking at about 520 nanometers which covers the blue, green and red wavelengths of the spectrum and produces white light.

Persistence time is the time, after discontinuing irradiation, that it takes for phosphorescence of a sample to decrease to the threshold of eye sensitivity. This threshold is the signal level of emission intensity that a naked (i.e., unaided) eye can clearly see in the dark. Persistence times are assessed by measuring phosphorescence intensity as a function of time. As used herein, "long persistent phosphor" refers to materials having persistence times exceeding 2 hours. The persistence time of phosphors of formula I may exceed two or more hours. It is generally the case that phosphors having longer persistence times are more preferred. Phosphors of formula I may exhibit phosphorescence persistence times of greater than about two hours.

The persistence of phosphors made in accordance with the present techniques may be longer than previous phosphors. A decay curve displays the decay time, e.g., the time required for the phosphor to stop emitting light after the excitation is removed. A typical phosphor can have a decay on a time scale of seconds.

Figure 3:
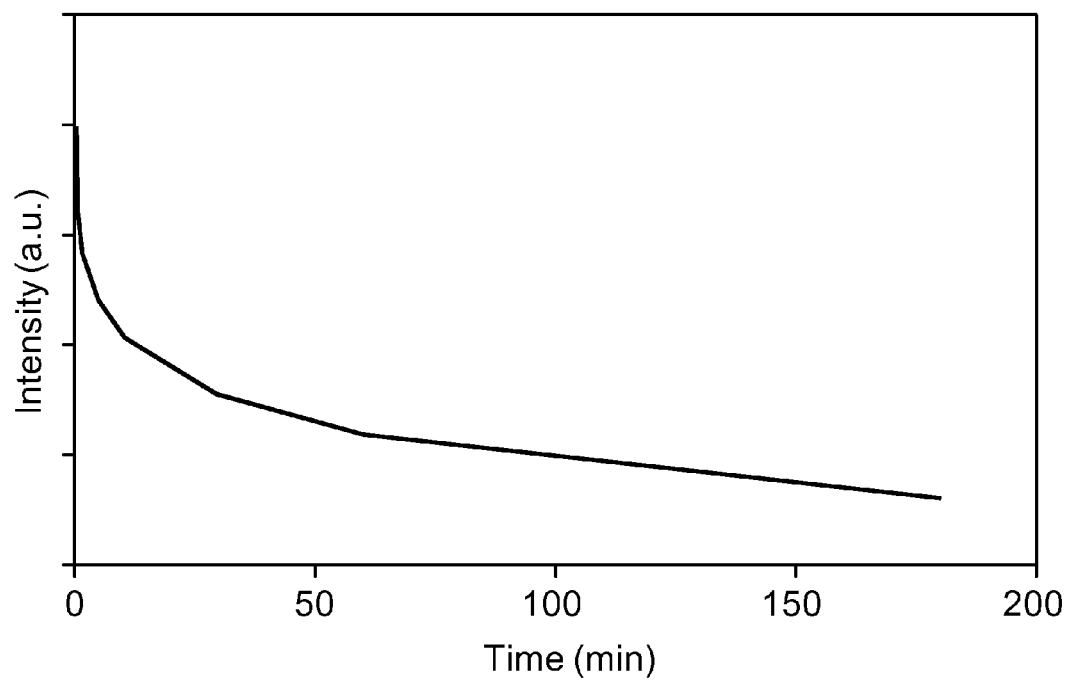
FIG. 3 is a decay curve showing the relatively high intensity over time for one of the persistent phosphors of this disclosure, $(Sr_{0.46}Eu_{0.01}Dy_{0.03}Ca_{0.5})Al_{1.9}B_{0.1}O_4$.

In contrast to the luminescence decay curves of a conventional phosphor, FIG. 3 is a decay curve of $(Sr_{0.46}Eu_{0.01}Dy_{0.03}Ca_{0.5})Al_{1.9}B_{0.1}O_4$ prepared according to this disclosure. As can be seen from this decay curve, much more energy may be retained at the equivalent period of time compared to a typical phosphor; the phosphor can persist for as long as 8 hours or more after the charging illumination has been removed. It should be noted that the scale used for decay is typically logarithmic and, thus, the value of the emission intensity at 8 hours is very weak as compared to the initial intensity. However, the remaining intensity may still be strong enough to still be seen by the human eye in a totally dark environment.

Example

Each of the samples described in Table 1 below had B, Eu and Dy in the following amounts in moles: B=0.10, Eu=0.01, Dy=0.03, with the molar amounts of Sr and Ca varying as described in the table. To produce each of the formulations of samples A through I, strontium carbonate, europium oxide, dysprosium oxide, calcium carbonate, aluminum oxide and boric acid were mechanically blended together in the appropriate molar ratios. The material was then placed in an alumina crucible and sintered at 1200° C. for 5 hours in a 1% hydrogen atmosphere (balance Nitrogen). This produced a solid solution of the formulation, $Sr_aEu_{0.01}Dy_{0.03}Ca_b Al_{1.9}B_{0.1}O_4$, where a and b are described in Table 1.

Figure 4:
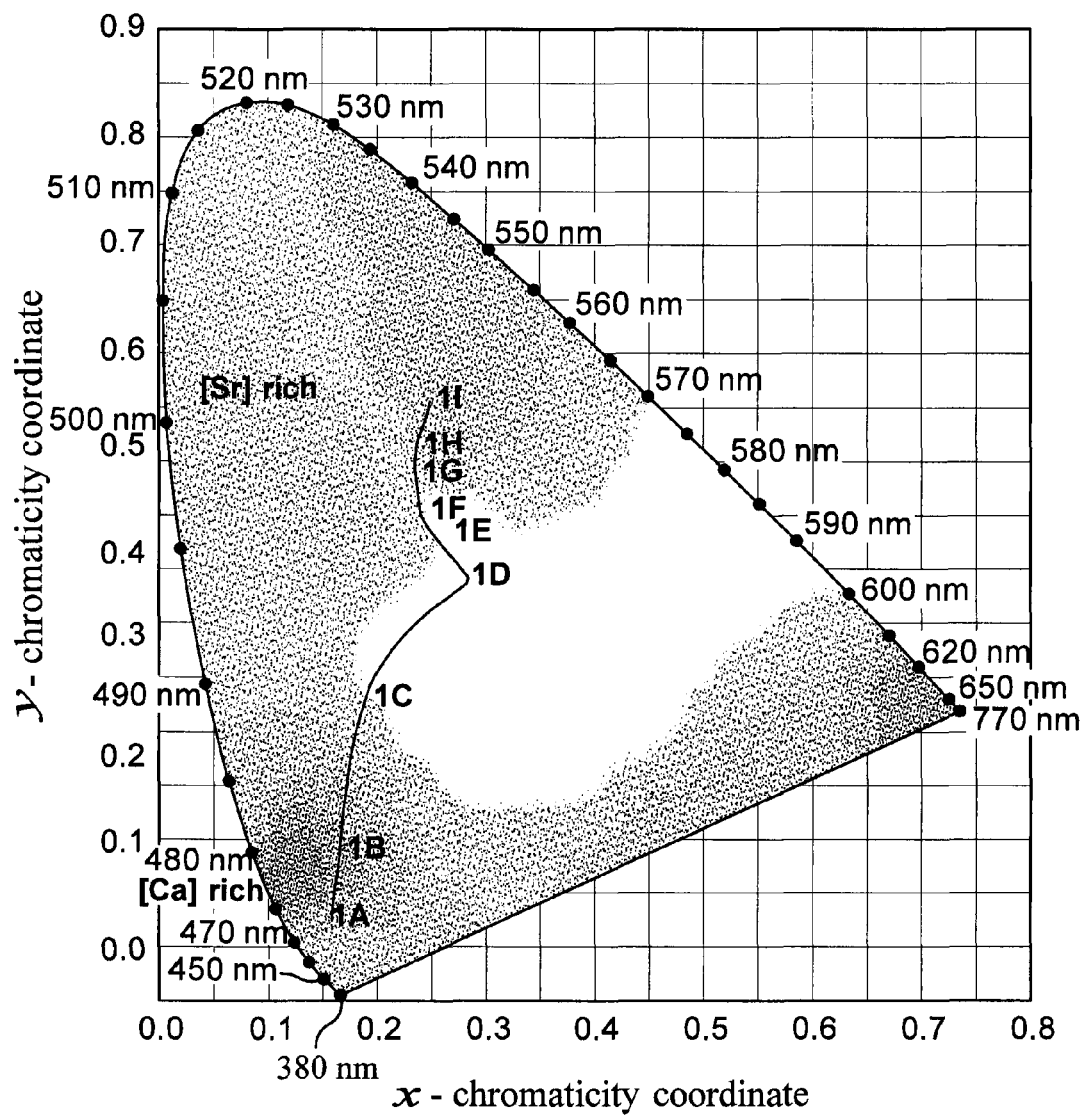
FIG. 4 is a chromaticity diagram of samples having a formulation, $Sr_aEu_{0.01}Dy_{0.03}Ca_bAl_{1.9}B_{0.1}O_4$, having varying concentrations of Sr and Ca described in Table 1.

FIG. 4 is a x,y chromaticity diagram, which is a standard color diagram in which the color points are derived by from the emission spectrum of the phosphor. In this diagram the chromaticity coordinates of samples A through I were plotted having varying molar concentrations of Sr (value a) and Ca (value b). The Sr, Ca molar concentrations in each sample and resulting chromaticity coordinates, ccx, ccy, are shown in Table 1 below.

TABLE 1

| Sample | [Sr, Ca] | ccx | ccy |
|---|---|---|---|
| A | 0.1, 0.9 | 0.1828 | 0.1222 |
| B | 0.2, 0.8 | 0.2027 | 0.2270 |
| C | 0.3, 0.7 | 0.2198 | 0.3125 |
| D | 0.4, 0.6 | 0.2851 | 0.4535 |
| E | 0.5, 0.5 | 0.2817 | 0.4931 |
| F | 0.6, 0.4 | 0.2801 | 0.5141 |
| G | 0.7, 0.3 | 0.2668 | 0.5428 |
| H | 0.8, 0.2 | 0.2656 | 0.5573 |
| I | 0.9, 0.1 | 0.2735 | 0.5935 |

The chromaticity FIG. 4 shows an unexpected result that the persistent phosphor of formula I is able to achieve white color as described in the absence of ambient light in the case of samples C to G. In these samples the concentration of Sr and Ca [Sr, Ca] in moles ranged from 0.3, 0.7 to 0.7, 0.3, respectively. In particular, samples D ([Sr, Ca]=0.4, 0.6) to E ([Sr, Ca]=0.5, 0.5) exhibited the best white persistence. It was expected that the tie line between [Ca] rich sample A ([Sr, Ca]=0.1, 0.9) and [Sr] rich sample I ([Sr, Ca]=0.9, 0.1) would have been linear between blue and green. In fact, a blend of the starting compound phosphors exhibited an emission under persistent conditions between blue and green. Instead, the emission color of the solid solution of this disclosure was nonlinear with [Sr, Ca] and the tie line veered so as to result in emission of white light in samples having a [Sr, Ca] between sample C ([Sr, Ca]=0.3, 0.7) to sample G ([Sr, Ca]=0.7, 0.3).

Figure 5:
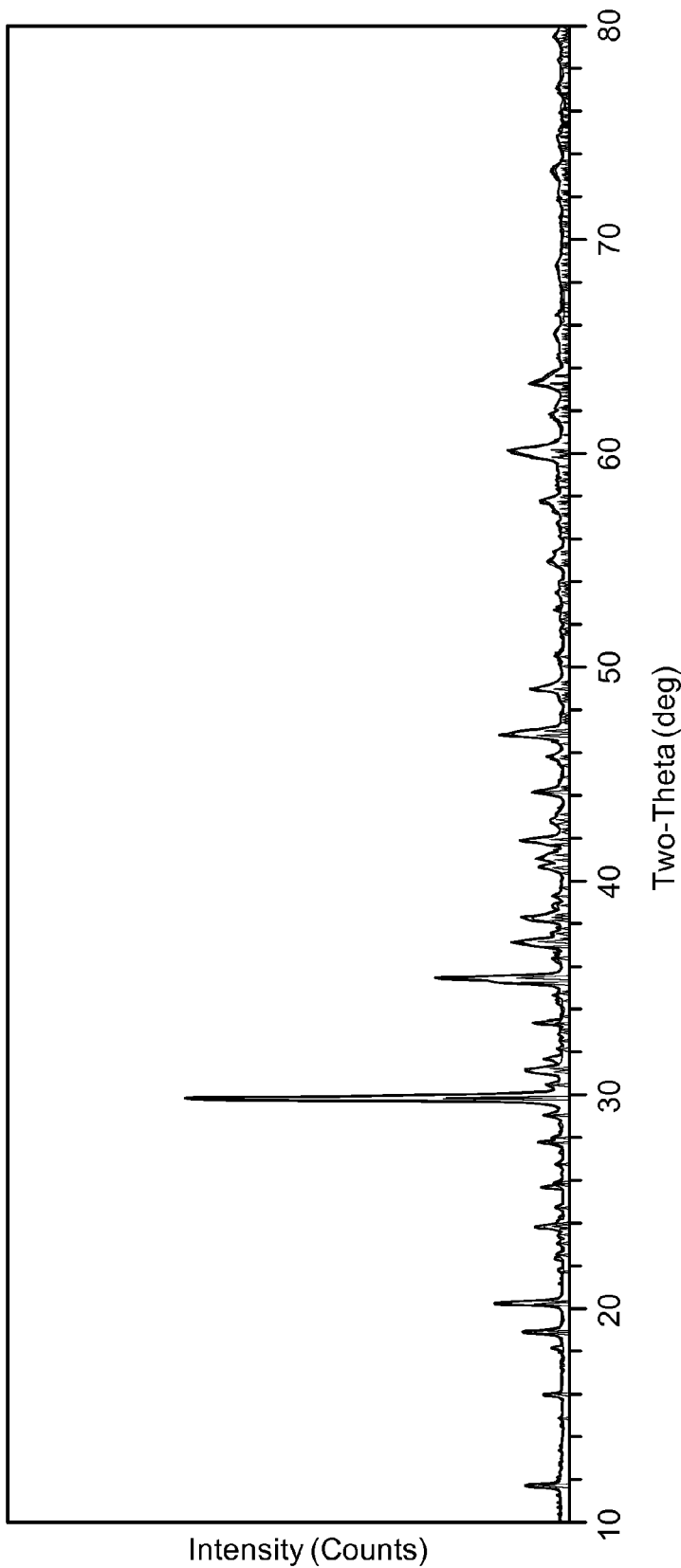
FIG. 5 is an X-ray diffractometry pattern for the phosphor, $Sr_{0.5}Ca_{0.5}Al_{1.9}B_{0.1}O_4$.

FIG. 5 is an X-ray diffractometry pattern for the phosphor, $Sr_{0.5}Ca_{0.5}Al_{1.9}B_{0.1}O_4$, which shows that when the phosphor is formulated as described in formula I in the manner described in this disclosure, a single phase crystalline material is produced. If Eu, Nd, Dy were present in the formulation in the small amounts specified in formula I, it would not affect this XRD pattern.

In general, various articles of manufacture discussed below, as described in the Ser. No. 12/640,712 application, may comprise the phosphors of formula I including luminous materials such as paints, inks, plastics, resins, ceramics and glasses. These materials may be used in novelty articles such as toys, jewelry, ornaments, writing implements, and apparel. The phosphors may be also used in any application requiring long term light emission in locations that have no energy source for powered lighting, particularly for lighting and signage in security, safety, and emergency egress applications.

The phosphors of formula I may be incorporated into numerous products used in low light applications, for example, the front faceplate of a car radio, or in the controls attached to the faceplate. The low toxicity of the phosphors of formula I makes applications such as toys and other commercial or consumer goods a possibility. Furthermore, the long persistence of the phosphor of formula I makes it useful for applications in safety apparel, such as hard hats, where the phosphors may be incorporated into the body or into stickers or decals applied to the side, or safety clothing with lettering, where the phosphor may be incorporated either in fibers making up the fabric of clothing or into the lettering.

The phosphors of formula I may also be used in safety signage and tape to form informational icons, such as directional arrows, pictograms, or text, when the phosphorescent material becomes the dominant light source upon the removal of ambient light. Thus, the informational icons begin to perceptually "glow" (luminesce) automatically upon failure of the ambient lighting system. The icons may be of a visually simple form, such as directional arrows guiding persons in the proper direction to access to the nearest emergency exit. Alternatively, or additionally, informational icons of such type can be deployed to point out important information, such as emergency evacuation information and directions, the location of fire extinguishers and electrical equipment, personal safety information, and location of life rafts, first-aid kits, communications terminals, or other emergency equipment. The phosphoresent material may also be used to demarcate the outlines and intersections of building structures, such as walls, stairs, etc. Informational icons may be formed in the text of any written language(s), or alternatively may be multi-lingual in character. Alternatively, or additionally, the informational icons may include any of the international standard pictograms, which convey information entirely through outline/area, and do not rely on color or text. Any of the aforementioned informational icons may be formed in a "positive" or "negative" manner, i.e., the icon can be defined by the presence of phosphorescent material against a background void of photoluminescence, or the icon can be defined by the absence of photoluminescence against a background containing the phosphorescent material.

The phosphors of formula I may be also be used in lighting systems for emergency egress. Such lighting systems can be used to provide lighting in stairwells, fire escapes, hallways, exits, and elevators and provide sufficient light in the event of a power failure to allow for safe and orderly exit from dark areas. The lighting systems include a light source and at least one phosphor of formula I radiationally coupled to the light source. Radiationally coupled means that the elements are associated with each other so radiation from one is transmitted to the other. Suitable light sources include, but are not limited to, fluorescent tubes, compact fluorescent lamps, LED lamps, and incandescent bulbs. The phosphor may be in direct contact with the light source, or may be physically separated from it, but positioned so that light of sufficient energy falls on the phosphor cause excitation. Thus, the phosphor may be coated over or directly on the light emitting surface of the light source by coating and drying a suspension of the phosphor. The surface on which the phosphor is disposed is typically transparent to allow white light to be transmitted through it. Although not intended to be limiting, in one embodiment, the median particle size of the phosphor may range from about 1 to about 20 microns. In a non-limiting example, the phosphors of formula I may be coated onto a surface of a fluorescent tube or envelope. The phosphors may be coated on the inside or outside surface of the tube. The phosphor of formula I may be used in a fluorescent lamp to produce white light, having a desired correlated color temperature (CCT) and color rendering index (CRI). The phosphor may be coated on the inside of the glass envelope of a fluorescent lamp with or without a barrier layer between the phosphor and the glass. The phosphor of formula I may be coated on the entire inside or outside surface of the tube or on only a bottom portion of the inside or outside surface. In another example, the phosphors may be contained in a film formed into a sleeve surrounding the fluorescent tube.

Other applications include fire call boxes from a fire system. The fire call box has both a visual indicator and/or signage that has at least one of the aforementioned phosphors incorporated therein or thereon. Similarly, a fire call box includes a visual indicator and/or signage. The background has the aforementioned phosphor incorporated therein or thereon. A card access reader from a security system includes a background structure and a reading device thereon. Either the background structure and/or the reading device have incorporated therein and/or thereon at least one of the aforementioned phosphors.

One of ordinary skill in the art will clearly recognize that other articles may use the phosphors such as a sensor, a panel, an access device, a sounder, a fire call box, an access card reader, and the like. Other uses of the phosphors may include ancillary uses to the fire and/or security systems. For example, signage or indicia (egress paths, egress items, etc.) related to the fire and/or security systems may employ the phosphor. To aid occupants and/or emergency personnel in the event of an emergency at least one of the aforementioned phosphors may be used. For example, egress paths show appropriate egress to an exit stairwell. Other ancillary articles that can use the phosphors may include a door knob or panic bar, stair nosings or risers, stair railings and the like.

Another aspect of the present invention is that a particular color (or group or range of colors) may be employed to provide an indication of function of the particular structure. For example, the aforementioned items may be colored using a green colored persistent phosphor and/or phosphor blends providing an indication that, in an event of an emergency, exiting via the stairwell is desired. Contrastingly, red-colored persistent phosphor and/or phosphor blends may be used at or in the path to the elevator so as to provide an indication, an event of an emergency, exiting via the elevator is not desired. In this manner, increased visibility of safety (e.g., fire, security, etc.) hardware and building access devices is provided. These different colored persistent phosphors would be used in addition to the white persistent phosphor as comprising part of the structure.

Only a few examples of articles of manufacture that comprise the phosphor of formula I are provided here and this is not intended to limit the phosphor to these applications or uses. Those skilled in the art will recognize that a long lived persistent phosphor may be useful in a large variety of applications beyond the ones listed above. For example, the material may be used as a phosphor in a cathode ray tube, in a plasma display device, in a liquid crystal display (LCD). The phosphors may also be used in a LED lamp. These and other articles that may comprise the phosphor are described in more detail in the Ser. No. 12/640,712 application.

The persistent phosphor may be applied on a structure, integrated in the structure, and/or be integrated in a coating on the structure. In an embodiment, the coating may be a paint. In another embodiment, the structure may be made of a resin. Similarly, the phosphors may be incorporated in the resin.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A persistent phosphor having the following formula I:

   I where a and b each range from about 0.3 to about 0.7; c is between 0 and about 0.1; $0.75 \leq a+b+c+y+z \leq 1.3$; y is between about 0.0005 and about 0.1; RE is any rare earth element alone or in combination; z is between about 0.0005 and about 0.15; m is between about 0.0005 and about 0.30; n is between 0 and about 0.10; o is between 0 and about 0.01; p is between 0 and about 0.10 and d ranges from about 3.945 to about 4.075, wherein once said persistent phosphor has been excited said persistent phosphor appears white in an absence of ambient light.

2. The persistent phosphor of claim 1 wherein RE is one or both of $Dy^{3+}$ and $Nd^{3+}$.

3. The persistent phosphor of claim 2 wherein RE is $Dy^{3+}$.

4. The persistent phosphor of claim 1 wherein a and b each range from about 0.4 to about 0.6.

5. The persistent phosphor of claim 1 wherein a ranges from about 0.3 to about 0.4 and b ranges from about 0.6 to about 0.7.

6. The persistent phosphor of claim 1 wherein a ranges from about 0.4 to about 0.5 and b ranges from about 0.5 to about 0.6.

7. The persistent phosphor of claim 1 wherein a ranges from about 0.5 to about 0.6 and b ranges from about 0.4 to about 0.5.

8. The persistent phosphor of claim 1 wherein a is about 0.3 and b is about 0.7.

9. The persistent phosphor of claim 1 wherein a is about 0.4 and b is about 0.6.

10. The persistent phosphor of claim 1 wherein each of a and b is about 0.5.

11. The persistent phosphor of claim 1, which is a single phase crystalline material as determined by X-ray diffractometry.

12. An article of manufacture comprising said persistent phosphor of claim 1.

13. The persistent phosphor of claim 1 wherein at least one of c, n, o and p is >0.

14. The persistent phosphor of claim 1 wherein a<0.7 and b>0.3.

15. The persistent phosphor of claim 1 wherein a ranges from 0.3 to 0.6 and b ranges from 0.4 to 0.7.

* * * * *

UNITED STATES PATENT AND TRADEMARK OFFICE
CERTIFICATE OF CORRECTION

PATENT NO. : 8,506,843 B2  
APPLICATION NO. : 12/971569  
DATED : August 13, 2013  
INVENTOR(S) : Alok Srivastava et al.

Page 1 of 1

It is certified that error appears in the above-identified patent and that said Letters Patent is hereby corrected as shown below:

On the Title Page, Item (57), in Abstract, please delete "$Sr_a, Ca_b, Ba_c\ Al_{2-m-n-o-p}O_d:Eu_y, RE_z, B_m, Zn_n, Co_o, Sc_p$," and add -- $Sr_a, Ca_b, Ba_c\ Al_{2-m-n-o-p}O_d:Eu_y, RE_z, B_m, Zn_n, Co_o, Sc_p$ --

In the Specification

Column 1, line 31, please delete "$Sr_a, Ca_b, Ba_c\ Al_{2-m-n-o-p}O_d:Eu_y, RE_z, B_m, Zn_n, Co_o, Sc_p$," and add -- $Sr_a, Ca_b, Ba_c\ Al_{2-m-n-o-p}O_d:Eu_y, RE_z, B_m, Zn_n, Co_o, Sc_p$ --

Column 1, line 52, please delete "$^3Sr^{2+}\ []_z$" and add -- $3Sr^{2+}\ []_z$ --

Signed and Sealed this  
Twenty-ninth Day of October, 2013

Teresa Stanek Rea  
*Deputy Director of the United States Patent and Trademark Office*